July 3, 1962  A. M. BOCK  3,042,423
VEHICLE FRAME

Filed Sept. 28, 1959  2 Sheets-Sheet 1

INVENTOR.
AUGUST M. BOCK
BY

ATTORNEY

July 3, 1962  A. M. BOCK  3,042,423
VEHICLE FRAME

Filed Sept. 28, 1959  2 Sheets-Sheet 2

*INVENTOR.*
AUGUST M. BOCK
BY

ATTORNEY

United States Patent Office 3,042,423
Patented July 3, 1962

3,042,423
VEHICLE FRAME
August M. Bock, Elkhart, Ind., assignor to Bock Industries of Elkhart, Indiana, Inc., Elkhart, Ind., a corporation of Indiana
Filed Sept. 28, 1959, Ser. No. 842,714
1 Claim. (Cl. 280—106)

The present invention relates to vehicle frames and more particularly to frames for trailers, mobile homes and similar vehicles.

In the mobile home and trailer fields one of the primary goals is to provide more enclosed room consistent with required mobility and maneuverability of the vehicle and with state highway laws and regulations with respect to width, length and height. Eight feet is the legal maximum width for all vehicles on the highways; however, since mobile homes are not primarily vehicles, but dwellings in transit, nearly all States have granted them special permits which allow them to be ten feet wide in transit. This is as wide as the permits can be expected to go since highway lanes are approximately ten feet wide. Mobile homes cannot be two stories and travel far on most highways. To meet the urgent need for room, they are being built four, five and even six times as long as they are wide, frequently mounted on a tandem axle undercarriage located to the rear of but relatively close to the center of the vehicle. In this construction large sections of the frame extending forward and rearward of the axles are otherwise unsupported, and consequently the vehicle has often tended to sag at both the front and back, causing distortion and misalignment in the entire structure of the vehicle. This results in poorly fitting doors and windows in their frames and unevenness of the floor and ceiling in the compartments of the vehicle. It is therefore one of the principal objects of the present invention to provide a frame structure for the bed of trailers and mobile homes, which retains its shape when mounted on a single axle or on a single tandem axle without causing any objectionable increase in the height and weight of the frame or vehicle.

Another object of the invention is to provide a frame for mobile homes, trailers and the like which provides the required strength and rigidity for supporting long bodies without drooping at either end or otherwise becoming distorted and out of line and which can readily be incorporated into such vehicles without modifying the widely used basic design and construction.

Still another object of the invention is to provide a relatively simple reinforced frame construction which can readily be fabricated and assembled, and shipped as a completed unit or shipped in prefabricated parts and assembled at the time the frame is incorporated into the final vehicle.

A further object is to provide a frame structure for trailers and mobile homes which can be made any desired width and varied in length over a wide range without changing the basic construction and fabrication of the frame, and which lends itself to various structural designs in the vehicle body.

Another object is to provide a strong rugged frame of the aforesaid type which will effectively withstand all normal transportation jarring and bouncing and will retain its shape when lifted on jacks and other types of supports and lifts without becoming bent, dented or otherwise damaged.

Additional objects and advantages will become apparent from the following description and accompanying drawings, wherein.

Figure 1:
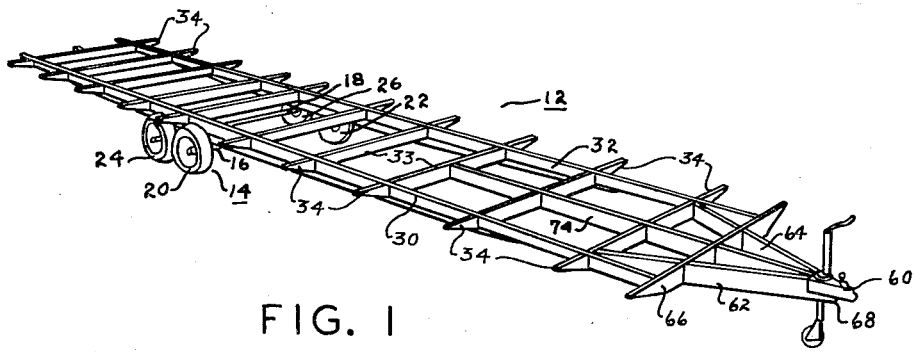
FIGURE 1 is a perspective view of my frame mounted on a tandem undercarriage and ready to receive the body of a mobile home or trailer.
Figure 4:
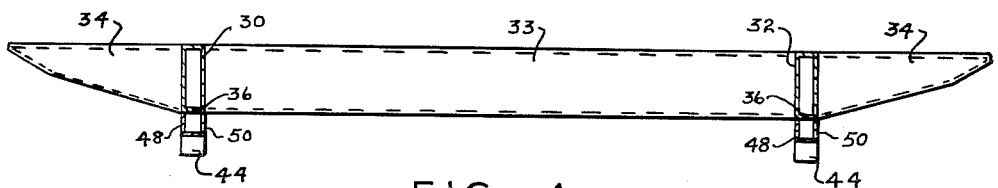
FIGURE 4 is a vertical cross sectional view of my frame taken on line 4—4 of FIGURE 3.
Figure 5:
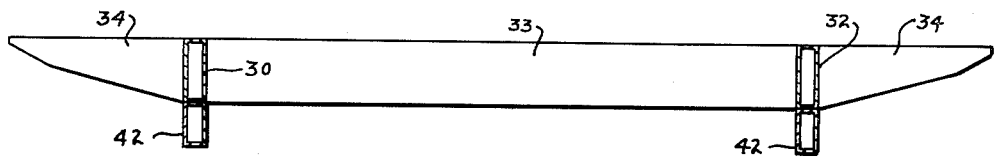
FIGURE 5 is a vertical cross sectional view of the frame taken on line 5—5 of FIGURE 3.
Figure 6:
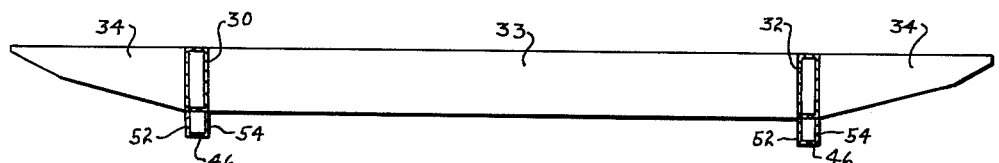
FIGURE 6 is a vertical cross sectional view of the frame taken on line 6—6 of FIGURE 3.
Figure 2:
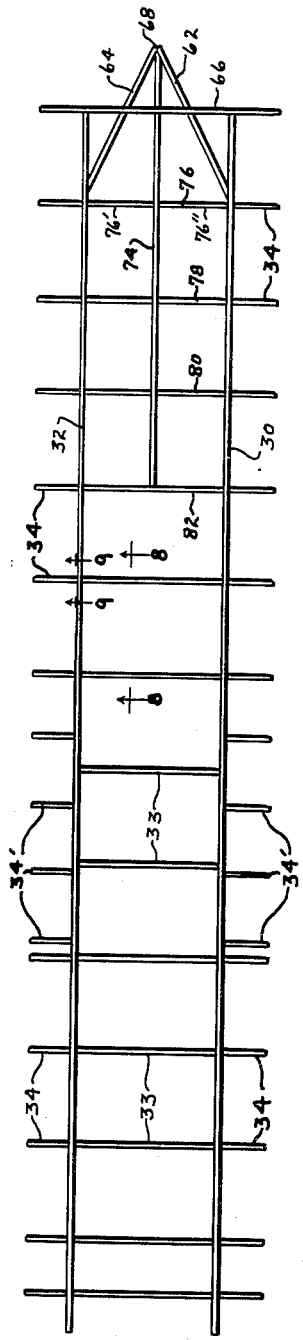
FIGURE 2 is a top plan view of the frame shown in FIGURE 1 removed from the undercarriage.
Figure 3:
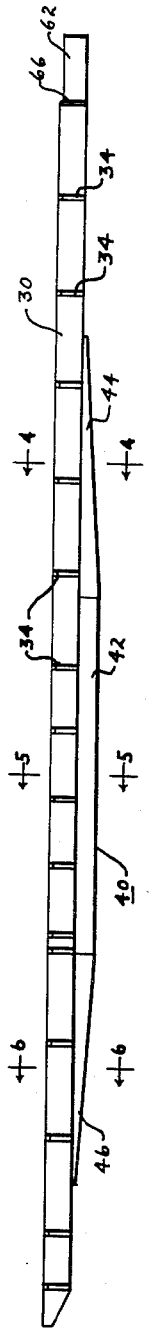
FIGURE 3 is a side elevational view of my frame shown in FIGURES 1 and 2.
Figure 9:
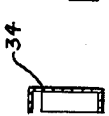
FIGURE 9 is a vertical cross sectional view of one of the outriggers of the frame taken on line 9—9 of FIGURE 2.
Figure 7:
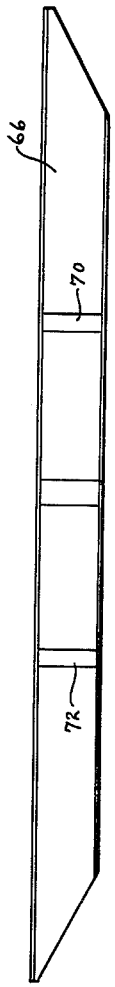
FIGURE 7 is a side elevational view of one of the special cross members of the frame, showing said member removed from the frame structure to reveal the details of the member.

Referring more specifically to the drawings and to FIGURE 1 in particular, numeral 12 indicates generally my frame for mobile homes, trailers and the like, shown mounted on a tandem axle undercarriage 14 consisting for example of two axles 16 and 18, and wheels 20, 22, 24 and 26 mounted on the axles. The frame is supported on the axles by a plurality of springs (not shown) attached to the axles near the wheels and to the underside of the frame. The frame may be mounted on a one, two or three axle undercarriage depending upon the size and weight of the body to be carried thereby; however, since the present frame structure is used primarily with long frames and relatively heavy bodies and content weight, a tandem axle undercarriage would normally be used.

Figure 8:
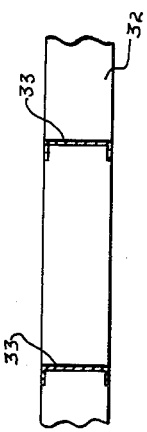
FIGURE 8 is a vertical cross sectional view of two of the standard cross members of the frame taken on line 8—8 of FIGURE 2.

The present frame consists of two longitudinal members 30 and 32 extending substantially the full length of the frame, and a plurality of cross members 33 equally spaced along the length of the frame and joined at their ends by welding to the internal side of the longitudinal members. Mounted on the outside of the longitudinal members and secured thereto by welding is a series of outriggers 34 preferably spaced along the longitudinal members in the same manner and at the same places as cross members 33. Longitudinal members 30 and 32 are preferably formed of sheet steel into a tube of rectangular cross section and welded along a seam 36 shown located in the bottom side of the member. These tubular longitudinal members will vary in size from one vehicle structure to another; however, they would normally measure approximately two inches in the lateral direction and from three inches to about eight inches in the vertical direction. The cross members 33 are preferably constructed of channel iron of the shape shown in FIGURE 8 and are of the same height as the longitudinal members with the upper surface flush with the upper surface of the longitudinal members in order to provide a firm support for the floor members laid on and secured to the upper surface of the frame. The outriggers are also modified channel iron members preferably tapering generally upwardly and outwardly to the outside edge of the frame. While as mentioned above the outriggers are usually spaced directly opposite the cross members, they may be arranged otherwise if necessary or desirable such as, for example, the spacing of outriggers 34' at different places along the longitudinal members to accommodate the wheels. When the cross members are welded at their ends to the longitudinal members and the outriggers are welded at their inner ends to longitudinal members, a rigid structure is formed which extends substantially the full length and width of the trailer or mobile home body and gives firm support to the side walls and floor throughout.

One of the principal features of the present invention is the truss 40 which permits the extended length of the frame without the forward and rear ends drooping or otherwise becoming out of line. The truss consists of straight member 42 secured to the underside of the longitudinal members directly above the axles and tapered members 44 and 46 to the front and rear of member 42, respectively, secured to the underside of the longitudinal members. Member 42 is formed of sheet metal into a tubular shape of rectangular cross section two inches wide and approximately four inches high and may be ten to fifteen feet in length depending on the overall length of the longitudinal members. Since the greatest length of the frame is in front of the wheels, the longitudinal center point of member 42 is also forward of the center position of the undercarriage. The two tapered members 44 and 46 are wedge shaped and formed as channels with the top part being open, and the edges of the two sides are joined by welding to the underside of the longitudinal members along the outside edges thereof. This type of truss structure not only gives greatly increased strength to the overall length of the frame so that no distortion takes place in use but also gives increased vertical strength for supporting the weight of the frame and body on the undercarriage. Further, since it is sometimes necessary to jack up the vehicle to change tires and repair the undercarriage, members 42, 44 and 46 form a sturdy means for engagement with the jack. Sides 48 and 50 of member 44 and sides 52 and 54 of member 46, being welded at their upper edges to the underside of the longitudinal members, transmit and distribute the forces throughout a substantial distance along the frame members so that no damage is produced by the jack.

The frame includes a means for mounting a hitch 60 to the trailer or mobile home in order to couple the vehicle to a towing vehicle, consisting of diagonal members 62 and 64 extending from the longitudinal members near the front thereof to a point at the front and center of the frame. Members 62 and 64 are welded to their respective longitudinal members, pass through member 66 and are joined together at numeral 68 by welding. Cross member 66 is provided with holes 70 and 72 through which members 62 and 64 are slipped during the assembly operation. In the longer frames it may be desirable to reinforce the front section by the use of a longitudinal rib 74 extending from the joint between members 62 and 64 rearwardly at the center through cross member 66 and through a number of the cross members 76, 78 and 80 and to member 82 to which the rear end of the rib is joined by welding. If desired, members 76, 78 and 80 may be formed in two sections, for example 76' and 76'', and welded in place between the rib and adjacent longitudinal member.

While only one embodiment of my frame has been described in detail herein, various changes and modifications may be made without departing from the scope of the invention. Throughout the description, welding has been mentioned as the means of joining the various structural members together; however, some of the joints may be made by riveting, bolting or by other suitable well known means.

I claim:

A bed for trailers, mobile homes and similar vehicles comprising, two longitudinal tubular members of rectangular cross section, a plurality of equally spaced channel iron cross members disposed between and joined at their ends to said longitudinal members, outriggers spaced along and joined to the outside of said longitudinal members, the bottom side of said outriggers sloping upwardly and outwardly, a central rib extending longitudinally between said longitudinal members and projecting beyond the most forward cross member, two diagonal members connected to the forward end of said rib and extending through said most forward cross members to said longitudinal members, a truss beneath each longitudinal member longitudinally overlapping and extending rearwardly of said central rib, each truss consisting of an elongated tubular member of rectangular cross section, a channel shaped mmeber with the open side up joined to the underside of the longitudinal member and tapering upwardly and forwardly from said elongated member, a channel shaped member with the open side up joined to the underside of the longitudinal member and tapering upwardly and rearwardly from said elongated member, and an undercarriage disposed beneath and connected to said elongated tubular members for supporting said frame.

References Cited in the file of this patent

UNITED STATES PATENTS

| | | |
|---|---|---|
| 1,954,637 | Linn | Apr. 10, 1934 |
| 2,105,713 | Werdehoff | Jan. 18, 1938 |
| 2,494,115 | Bock | Jan. 10, 1950 |
| 2,791,439 | Swanson | May 7, 1957 |
| 2,861,811 | Lassen | Nov. 25, 1958 |
| 2,876,036 | Olson | Mar. 3, 1959 |